United States Patent
Nakajima et al.

(10) Patent No.: US 7,795,558 B2
(45) Date of Patent: Sep. 14, 2010

(54) ELECTRIC DISCHARGE MACHINE AND ELECTRIC DISCHARGE MACHINING METHOD

(75) Inventors: Yoji Nakajima, Tokyo (JP); Hisakatsu Kawarai, Tokyo (JP); Syuichiro Ishihara, Tokyo (JP); Hisashi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 458 days.

(21) Appl. No.: 11/660,698

(22) PCT Filed: Apr. 5, 2006

(86) PCT No.: PCT/JP2006/307198

§ 371 (c)(1), (2), (4) Date: Feb. 21, 2007

(87) PCT Pub. No.: WO2007/113906

PCT Pub. Date: Oct. 11, 2007

(65) Prior Publication Data

US 2009/0057274 A1     Mar. 5, 2009

(51) Int. Cl.
*B23H 1/10* (2006.01)
(52) U.S. Cl. .................................. 219/69.14
(58) Field of Classification Search .............. 219/69.14, 219/69.11, 69.12, 69.13
See application file for complete search history.

(56) References Cited

U.S. PATENT DOCUMENTS 5,081,333 A * 1/1992 Yatomi et al. ............ 219/69.14
5,422,455 A * 6/1995 Sato et al. ................ 219/69.13
5,475,195 A * 12/1995 Delpretti ................... 219/69.12
2003/0050350 A1* 3/2003 Bachman et al. ............... 521/32
2007/0289925 A1* 12/2007 Kawarai et al. .......... 219/69.14

FOREIGN PATENT DOCUMENTS

| DE | 2851482 C2 | 12/1991 |
|---|---|---|
| DE | 4391902 C2 | 12/1998 |
| DE | 112005002782 T5 | 3/2008 |
| JP | 58-137524 A * | 8/1983 |

(Continued)

OTHER PUBLICATIONS

Korean Office Action for KR-10-2007-7001128 dated Mar. 12, 2008.

(Continued)

*Primary Examiner*—Geoffrey S Evans
(74) *Attorney, Agent, or Firm*—Sughrue Mion, PLLC

(57) ABSTRACT

In an electric discharge machining apparatus that machines a workpiece (1) by using a water-based dielectric fluid as a dielectric fluid while a voltage is being applied to a machining gap between an electrode (2) and the workpiece (1), the electric discharge machine includes:

an anticorrosive power source section (26) that applies a predetermined voltage by taking the workpiece (1) as a cathode and taking as an anode an anticorrosive electrode (25) opposing the workpiece (1) with an insulator (24) therebetween;

a dielectric fluid quality measuring instrument (22) that measures a quality of the dielectric fluid; and a dielectric fluid quality control section (16, 17, 18, 19, 20, 21, 23) that controls a pH level of the dielectric fluid to be within a range from 8.5 to 10.5 on the basis of the measured result of the dielectric fluid quality measuring instrument (22).

11 Claims, 4 Drawing Sheets

FOREIGN PATENT DOCUMENTS

| | | |
|---|---|---|
| JP | 63191514 A | 8/1988 |
| JP | 01-164489 A | 6/1989 |
| JP | 4-75820 A * | 3/1992 |
| JP | 05-042414 A | 2/1993 |
| JP | 05-220618 A | 8/1993 |
| JP | 5-269624 A | 10/1993 |
| JP | 8-9030 B2 | 1/1996 |
| JP | 2694145 B2 | 9/1997 |
| JP | 11-070414 A | 3/1999 |
| JP | 2002301624 A | 10/2002 |
| JP | 2004-291206 A | 10/2004 |
| JP | 3708087 B2 | 8/2005 |

OTHER PUBLICATIONS

German Office Action dated Jun. 27, 2008.

* cited by examiner

ELECTRIC DISCHARGE MACHINE AND ELECTRIC DISCHARGE MACHINING METHOD

TECHNICAL FIELD

The present invention relates to an electric discharge machine which prevents metallic corrosion, which would otherwise be caused as a result of a workpiece being immersed in a dielectric fluid for a long period of time.

BACKGROUND ART

In an electrical discharge machine, when water is used as a dielectric fluid, electrical insulation is required. For instance, ion-exchanged water is produced by ion-exchange resin formed from water-purifying resin into which are mixed an $H^+$-type(a hydrogen ion) positive ion exchange resin and an $OH^-$-type(a hydride ion) ion exchange resin. Machining is performed by use of the ion-exchanged water.

Cations contained in service water, such as sodium ions ($Na^+$) and calcium ions ($Ca^{2+}$), contact the $H^+$-type positive ion exchange resin, whereupon the positive ions are exchanged with $H^+$ ions. Further, as a result of negative ions, such as chloride ions ($Cl^-$) and sulfate ions ($SO_4^{2-}$), contacting the $OH^-$-type negative ion exchange resin, the negative ions are exchanged with the $OH^-$ ions. Consequently, impurities contained in the service water employed as a dielectric fluid are removed, and $H^+$ ions and $OH^-$ ions bond together to thus generate water, whereby a dielectric fluid required for electric discharge machining can be produced.

The conductivity of an impurity-removed dielectric fluid suitable for electric discharge machining is generally 70 μS/cm or less. A pH value is determined by the degree of the concentration of hydrogen ions. However, the $OH^-$ ions exchanged with hydrogen carbonate ions ($HCO_3^-$) diffuse into the dielectric fluid, and hence extreme changes do not appear in the degree of the concentration of the hydrogen ions. The dielectric fluid usually exhibits a pH value of 7.

In an electric discharge machine using the water-based dielectric fluid, a pulse voltage is applied between a workpiece and an electrode while the dielectric fluid is being squirted to the workpiece or while the workpiece is being immersed in the dielectric fluid, to thus effect electric discharge and machining. As a result of the workpiece being immersed in the dielectric fluid for a long period of time, metal forming the workpiece is known to be corroded away, so that the quality of the workpiece is deteriorated.

For this reason, there has been proposed a method for preventing corrosion of a workpiece by sandwiching an insulation material between a table and the workpiece; taking the table as an anode and the workpiece as a cathode; and applying a voltage to the workpiece during non-machining operation (e.g. Patent Document 1).

Moreover, there has also been proposed a method for preventing corrosion of a workpiece by taking the table or the workpiece set in a working tank as a cathode, and taking as an anode a second electrode provided on the table or the workpiece through the dielectric fluid; and applying a minute electric current and a minute voltage to the cathode and the anode (e.g. Patent Document 2).

Also, there has been proposed a technique to prevent corrosion of metal by causing water to flow through ion exchange resin to thus control pH of water (e.g. Patent Document 3).

Patent Document 1: JP-A-2004-291206
Patent Document 2: JP-A-5-220618
Patent Document 3: JP-A-1-164489

DISCLOSURE OF THE INVENTION

Problems that the Invention is to Solve

When corrosion of the workpiece is prevented by such a method as described in Patent Document 1, the table is taken as the anode during non-machining operation, and the workpiece is taken as the cathode. Corrosion of the workpiece can be prevented during the non-machining operation. However, the method encounters a problem of a failure to prevent corrosion of the workpiece during machining or a problem of corroding the table, because the table is taken as the anode.

The method of Patent Document 2 yields a constant advantageous effect of preventing corrosion, so long as the duration in which the workpiece is immersed in a dielectric fluid is a short period of time. For instance, in the case of long-hour machining where machining involves consumption of 100 hours or more, concern arises about corrosion of the workpiece:

Even when a pH value is controlled under the method of Patent Document 3, the workpiece must be fastened onto the table in the electric discharge machine. When the table and the workpiece are formed from different kinds of materials, a potential difference arises. Particularly, when the workpiece is of higher ionization tendency than the table, there arises a problem of corrosion of the workpiece.

The present invention has been conceived to solve the problems and aims at providing an electric discharge machine capable of preventing corrosion of a workpiece during the periods of machining and non-machining operations.

Means for Solving the Problems

The electric discharge machine of the present invention prevents occurrence of electrical corrosion by applying a voltage through use of a dielectric fluid whose pH ranges from a value of 8.5 to a value of 10.5 while taking a table and a workpiece as the cathodes and taking an anticorrosive electrode in a working tank as the anode.

Advantages of the Invention

According to the present invention, when corrosion of a workpiece is prevented by applying a voltage, a dielectric fluid whose pH value ranges from 8.5 to 10.5 is used. As a result, there is yielded a distinguished, unprecedented effect of preventing corrosion of a workpiece, which would otherwise be caused during a period of long-time machining at a low applied voltage or during a non-machining period.

BRIEF DESCRIPTION OF THE DRAWINGS

FIG. 1 is a block diagram showing an electrical wire discharge machine according to a first embodiment of the present invention.

FIG. 2 is a top view of a working tank when viewed from above.

FIG. 3 is a graph showing a relationship between the conductivity of an aqueous NaOH solution and a pH value.

FIG. 4 is a flowchart showing control operation of the first embodiment.

FIG. 5 is a block diagram of an electrical wire discharge machine according to a second embodiment of the present invention.

BEST MODE FOR CARRYING OUT THE INVENTION

First Embodiment

Figure 1:
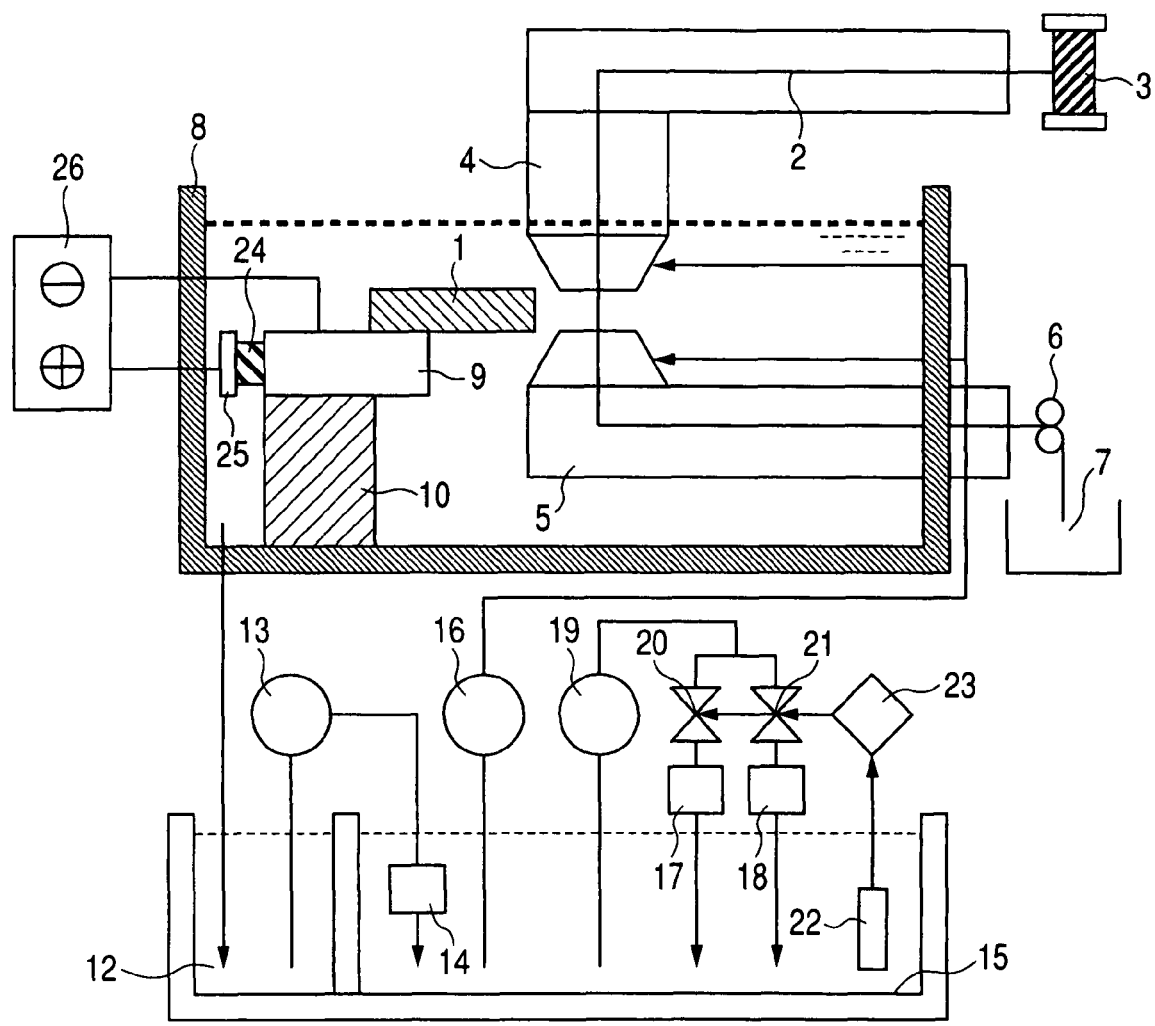
[FIG. 1]

FIG. 1 is a block diagram showing an electrical wire discharge machine according to a first embodiment of the present invention. The electrical wire discharge machine proceeds with machining by applying a voltage between a workpiece 1 and a wire electrode 2 within a working tank 8; and causing an electrical discharge through a dielectric fluid squirted from an upper dielectric fluid nozzle 4 and a dielectric fluid squirted from a lower dielectric fluid nozzle 5, to thus fuse and eliminate the target areas of the workpiece 1.

At this time, an electrical discharge portion of the wire electrode 2 is also fused/deteriorated in accordance with a progress in electrical discharge operation. Accordingly, the wire electrode 2 wound around a wire bobbin 3 is continuously fed to a recovery box 7 through the upper dielectric fluid nozzle 4, the lower dielectric fluid nozzle 5, and a recovery roller 6 so that a new wire electrode 2 is fed to the machining section in association with a progress in machining; and the thus-fed wire electrodes are recovered.

After having washed away sludge from the machining section, the dielectric fluids squirted from the upper dielectric fluid nozzle 4 and the lower dielectric fluid nozzle 5 contain large amounts of impurities. The dielectric fluids are temporarily stored in the working tank 8 and subsequently led to and stored in a waste fluid tank 12 through a pipeline.

The dielectric fluid in the waste fluid tank 12 is delivered to a filter 14 by a filtration pump 13. The impurities are filtered, and the filtered dielectric fluid is stored in a clean fluid tank 15.

The conductivity of the dielectric fluid in the clean fluid tank 15 is measured by a conductivity meter 22 serving as a dielectric fluid quality measuring instrument. A control section 23 compares a measurement result output from the conductivity meter 22 with a preset value, and a water-purifying resin solenoid valve 20 or an anticorrosive resin solenoid valve 21 is opened and closed, to thus feed water into a water-purifying resin column 17 or an anticorrosive resin column 18 by a pump 19.

The dielectric fluid having passed through the water-purifying resin column 17 and the anticorrosive resin column 18 is returned to the clean fluid tank 15, and is squirted between the workpiece 1 and the wire electrode 2 by the upper dielectric fluid nozzle 4 and the lower dielectric fluid nozzle 5.

There will now be described an anticorrosive power source section.

Figure 2:
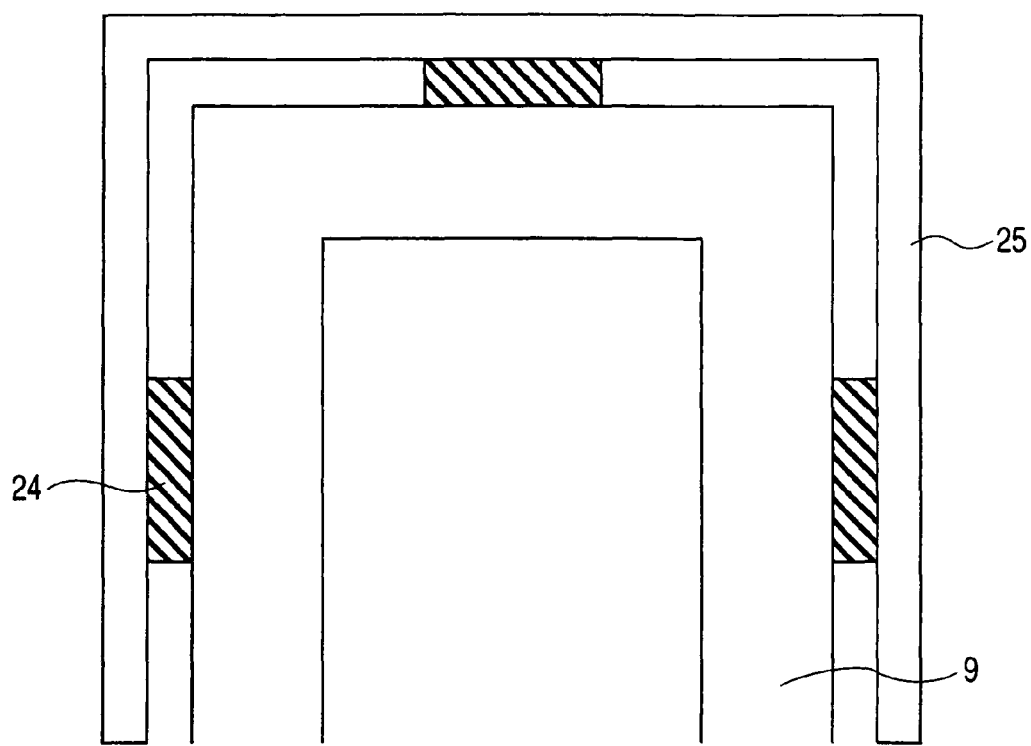
[FIG. 2]

As shown in FIG. 2, an anticorrosive electrode 25 made of a conductive material is placed, in an electrically-insulated manner, on an outer peripheral side surface of a table 9, which is formed from stainless steel, through an insulator 24.

A voltage is applied while the table 9 is taken as the cathode and the anticorrosive electrode 25 is taken as the anode, by an anticorrosive power source 26 which is a DC power source or a deflected AC power source.

Au (gold) and Pt (platinum), which are superior in corrosion resistance, a composite material plated or sputtered thereby, stainless steel, and the like are suitable for the anticorrosive electrode 25.

A larger area of the anticorrosive electrode 25 is preferable, because electrical resistance thereof becomes smaller and a voltage applied thereto can be reduced. However, when the anticorrosive electrode 25 is too wide, deterioration of workability in the working tank 8 and a reduction in the footprint of the workpiece 1 will be conceived, which in turn will degrade the function unique to the electric discharge machine. For these reasons, the present embodiment employs the anticorrosive electrode 25 which surrounds the table 9 and has the same surface area as that of the side surface of the table.

The surface on one side that does not oppose the side surface of the table is coated with paint, whereby the efficiency of inflow of an electric current into the table 9 is improved. Exhibition of an anticorrosion effect and a reduction in useless power consumption can be achieved.

The table 9 is fixed to the working tank 8 by a mount 10 formed from an insulator such as ceramic or the like.

The water purifying resin is inserted in the water purifying resin column 17, and mixed resin consisting of $Na^+$ positive ion exchange resin and $OH^-$ negative ion exchange resin is inserted in the anticorrosive resin column 18.

Service water is caused to flow through the water purifying resin column 17, to thus produce a dielectric fluid (70 μS/cm or less, a pH value of 7). In order to control the conductivity of the dielectric fluid, water is caused to flow through the anticorrosive resin column 18, whereby the dielectric fluid turns into a diluted aqueous NaOH solution.

Figure 3:
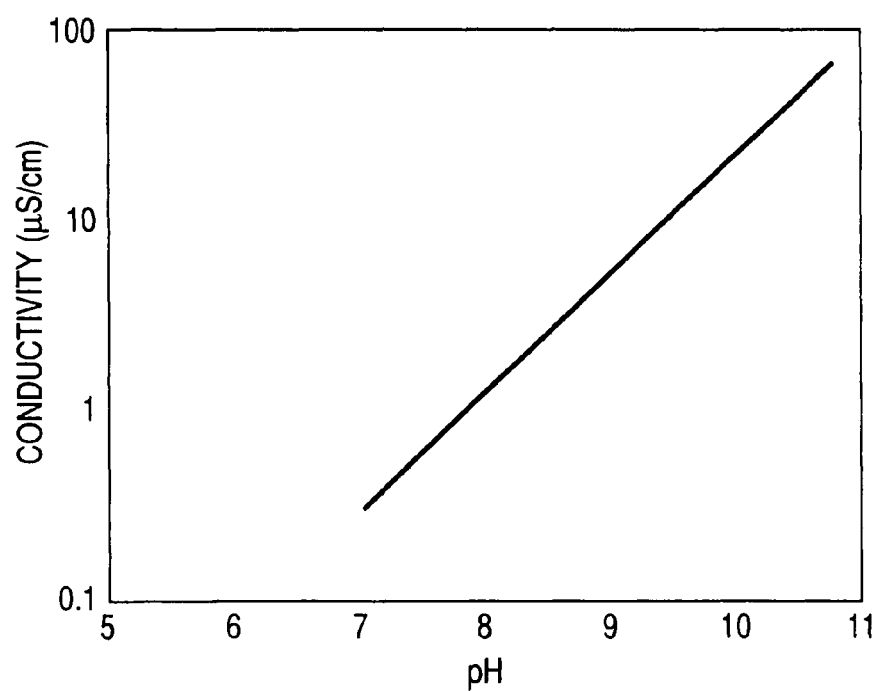
[FIG. 3]

As shown in FIG. 3, a relationship between the conductivity of the aqueous NaOH solution and a pH value is proportional. From this fact, in the present embodiment, the pH level of the dielectric fluid is controlled by controlling the conductivity of the dielectric fluid.

The anticorrosive resin does not need to be a mixture of the positive ion exchange resin and the negative ion exchange resin, but may be two ion exchange resin columns into which the positive ion exchange resin and the negative ion exchange resin are sealed separately. In addition to $Na^+$ positive ion exchange resin, $K^+$ positive ion exchange resin or $Ca^{2+}$ positive ion exchange resin is conceivable as positive ion exchange resin. At least one type of positive ion exchange resin is used. Negative ion exchange resin other than $OH^-$ negative ion exchange resin may be usable. At least one type of negative ion exchange resin can be used.

The majority of impurity positive ions of the water having flowed into the water purifying resin column 17 are $Na^+$ ions. Therefore, although the accuracy of correlation between a conductivity and a pH level is degraded, only the $OH^-$ negative ion exchange resin may be used as anticorrosive resin.

Figure 4:
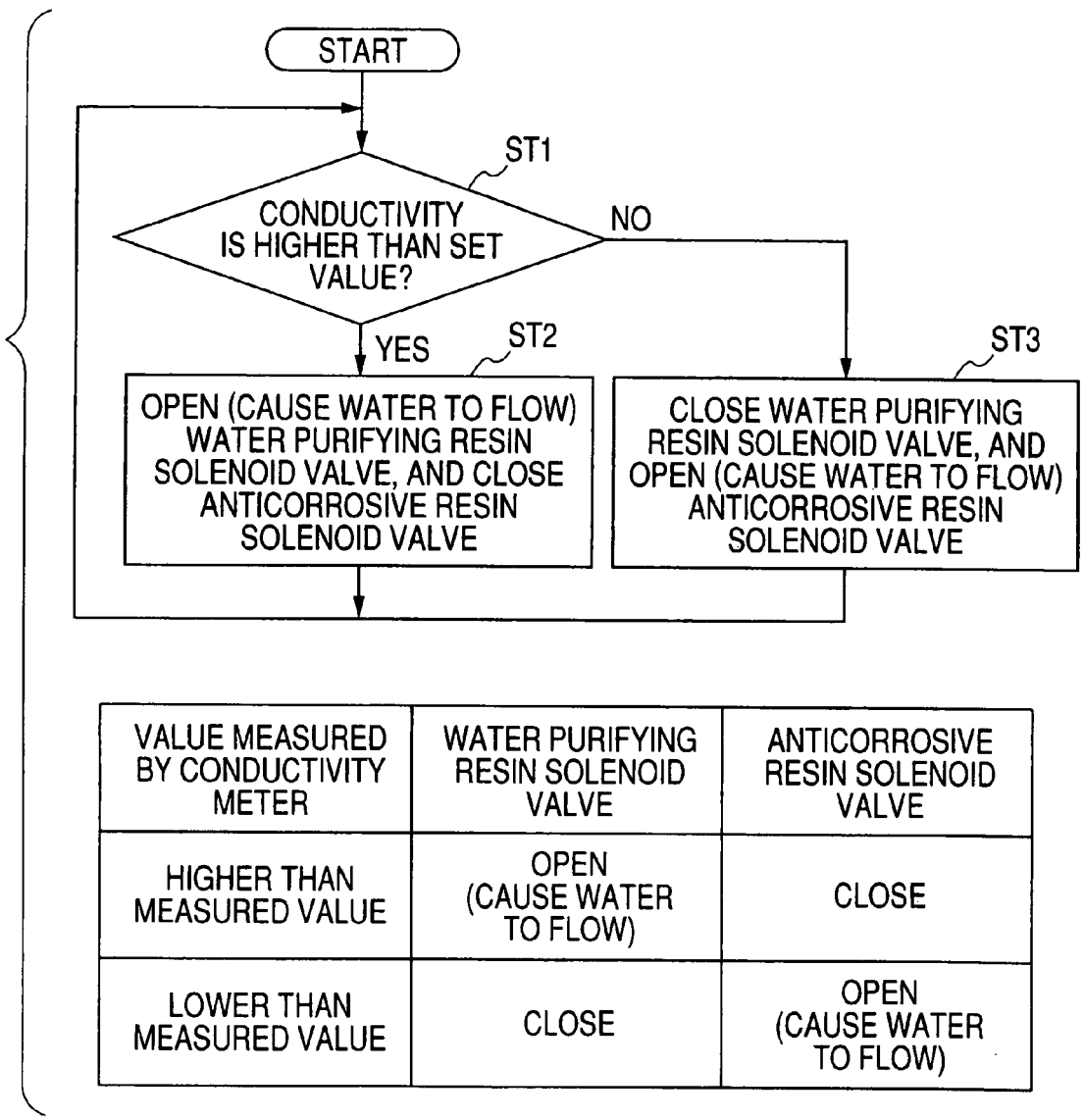
[FIG. 4]

Control operation of dielectric fluid quality control section will now be described with reference to FIG. 4. For instance, pH assumes a value of 9.0 when the conductivity set for the dielectric fluid assumes a value of 6.2 μS/cm. Accordingly, a determination is made as to whether or not the value measured by the conductivity meter 22 is higher than the preset value (ST1). In the case of high conductivity (a pH value), the water purifying resin solenoid valve 20 is activated, thereby delivering the dielectric fluid in the clean fluid tank 15 to the water purifying resin column 17 through a pipe. Metal ions generated by electric discharge machining, carbonate ions caused by carbon dioxide in the atmosphere, and the like, are removed, to thus lower the conductivity (pH value) of the dielectric fluid (ST2).

When the conductivity (a pH value) of the dielectric fluid has become lower than the preset value, the anticorrosive resin solenoid valve 21 is activated so as to maintain a pH value and prevent impairment of corrosion-resistant characteristics of the dielectric fluid. The dielectric fluid in the clean fluid tank 15 is sent to the anticorrosive resin column 18 through the pipe. The conductivity (pH value) of the dielectric fluid is set so as to be maintained in the vicinity of the preset value (ST3).

Working conditions in the embodiment will now be described.

In the experiment conducted by the inventors of the present invention, at the time of machining the workpiece 1, such as a superhard material (WC—Co, or the like), Cu (copper), an ion-based material (SKD-11), zinc (Zn), or the like, the workpiece was immersed in a dielectric fluid having a pH value of 8.0 for 100 hours, the workpiece was corroded. In the case of the dielectric fluid having a pH value of 8.5, no corrosion arose. Therefore, it was found that anticorrosive effect can be exhibited, so long as pH assumes a value of 8.5 or more.

In order to maintain the dielectric fluid at a pH value of 8.5 or less, the conductivity of the dielectric fluid must be reduced to 2.0 µS/cm or less. The life of the ion exchange resin is considerably decreased so that maintaining a pH value of 8.5 or less is not practical. Therefore setting a lower limit of pH to a value of 8.5 is preferable.

When a pH increases, the conductivity of the dielectric fluid increases, and a leakage current also increases. Thus, difficulty is encountered in ensuring an insulation recovery time. Accordingly, electric discharge machining performance is deteriorated, and hence the upper limit of pH is preferably set to 10.5.

In the present embodiment, the anticorrosive resin solenoid valve 21 is activated by use of the conductivity meter 22 such that a preset pH value of 9.0 is achieved, to thus deliver the dielectric fluid in the clean fluid tank to the anticorrosive resin column 18. The conductivity of the dielectric fluid is controlled so as to assume a pH value of 9.0 or thereabouts. Subsequently, electric discharge machining is performed while the dielectric fluid is being fed to a gap between the workpiece 1 and the wire electrode 2.

An applied voltage of about 1 to 20 volts is applied to the table 9 and the anticorrosive electrode 25 during electric discharge machining or non-machining operation. As a result, corrosion of the workpiece 1 can be prevented during non-machining operation as well as during machining operation.

For example, when the workpiece 1 is a superhard material (WC—Co) or an iron-based material (SKD-11), the conductivity of the dielectric fluid is controlled to 6.2 µS/cm (corresponding to a pH value of 9.0) and a voltage of 5 volts is applied between the table 9 and the anticorrosive electrode 25, whereby corrosion can be prevented during machining operation for a long period of time (100 hours or more) or non-machining operation.

In the present embodiment, a case where ion exchange resin and anticorrosive resin are used has been described as a method for controlling the pH level of the dielectric fluid to 8.5 to 10.5. Also, a method for charging a chemical into the dielectric fluid and a method utilizing an electrolytic water generator are also conceivable.

When the method for charging a chemical is utilized, chemicals containing alkaline earth elements, such as sodium hydroxide (NaOH), calcium hydroxide [$Ca(OH)_2$], and the like, are conceivable. It is better to charge the chemical into a dielectric fluid (70 µS/cm or less, a pH value of 7) achieved after service water has been caused to flow into the water purifying resin.

When the electrolytic water generator is used, it is better to subject to electrolyzation the dielectric fluid (70 µS/cm or less, a pH value of 7), which is achieved after service water has been caused to flow through the water purifying resin, to thus produce electrolytic water having a pH value of 8.5 to 10.5.

Specifically, when any of these three methods is employed, the pH level is adjusted in accordance with a command from the control section 23, by use of at least one type of measuring instrument among fluid chamber measuring instruments; e.g., a conductivity meter, a pH meter, and an oxidation-reduction potentiometer. However, in terms of conductivity controllability which affects machinability and pH controllability which affects the anticorrosion performance of a workpiece, a method using ion exchange resin and anticorrosive resin is suitable.

The inventors also found that a required application voltage of the anticorrosive power source section varies according to the pH value of the dielectric fluid.

The reason for this is that the solubility of a metallic element forming the workpiece varies according to a pH value.

For instance, when the pH value of the dielectric fluid is 8.5 or less, the anticorrosive electrode having the same structure as that of the anticorrosive electrode described in connection with the embodiment required an application voltage of 30 volts or more, although the voltage was affected by the shape of the anticorrosive electrode 25, that of the table 9, an opposing area of the electrode, and a gap.

In the meantime, in the present embodiment, corrosion can be prevented at an application voltage of 5 volts as mentioned above. The configuration of the anticorrosive power source 26 can also be simplified.

The application voltage is determined in consideration of the location where the anticorrosive electrode 25 is to be positioned, the area of the anticorrosive electrode, the shape of the anticorrosive electrode, and the shape of the workpiece. However, in the case of an application voltage of one volt or less, corrosion of the workpiece 1 fastened to the table 9 cannot be prevented. In the case of an application voltage of 30 volts or more, hydrogen is caused to arise from the surface of the workpiece by electrolysis of the dielectric fluid, thereby deteriorating machining performance. Accordingly, the range of application voltage over which corrosion of a workpiece, which would otherwise be caused when the workpiece is machined or remains unmachined in a dielectric fluid having a pH value from 8.5 to 10.5 for a long period of time (100 hours or longer), is prevented is preferably 1 volt to 20 volts.

As a result of the pH value of the dielectric fluid being set to a range from 8.5 to 10.5, the application voltage of the anticorrosive power source section can be lowered.

When compared with the conventional case, the gap between the anticorrosive electrode and the table can be broadened at a smaller application voltage. Hence, placing an anticorrosive electrode at the extremity of a nozzle or a location close to a workpiece, which has conventionally been required, can be obviated. As in the case of the present embodiment, the range of design of the anticorrosive power source section is broadened as in the case of placement of the anticorrosive electrode around the table, and the like. An electric discharge machine, which is not affected by the anticorrosive power source section, can also be designed.

Second Embodiment

Figure 5:
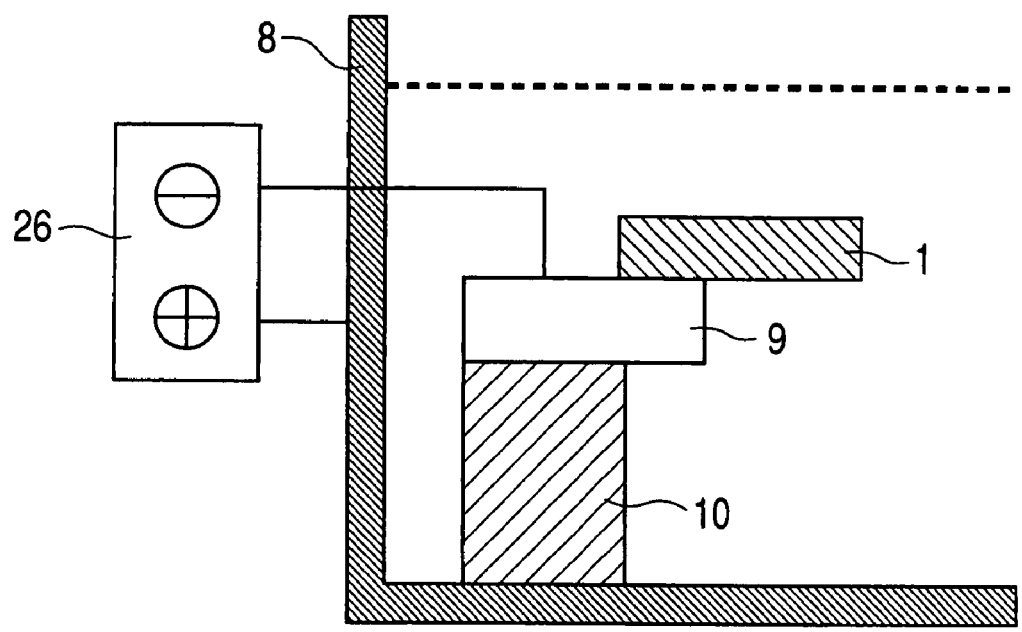
[FIG. 5]

In the present embodiment, the working tank 8 is imparted with the function of the anticorrosive electrode as shown in FIG. 5.

According to the configuration, the working tank 8 and the table 9 are insulated from each other by the mount 10. The dielectric fluid exists between the working tank 8 and the table 9. Hence, the insulator 24 becomes obviated. Further, the area of the electrode is wide, and hence the electrical resistance of the electrode is lowered, which in turn enables a reduction in voltage and current.

By the wire electrical discharge machine having the method for preventing corrosion of a workpiece, which would otherwise be caused by application of the voltage, the conductivity of the dielectric fluid was controlled to 6.2 µS/cm (corresponding to a pH value of 9.0). Further, a voltage of 3 volts was applied between the table 9 and the working tank 8. Thus, corrosion of a superhard material (WC—Co) or an iron-based material (SKD-11) was prevented during long-hour (100 hours or more) machining operation or non-machining operation.

Specifically, in the electrical discharge machine using a dielectric fluid having a pH value from 8.5 to 10.5 can be equipped with an anticorrosive power source section in a simpler manner as that required in the related art. Further, a high corrosion-resistant effect can be attained.

INDUSTRIAL APPLICABILITY

The present invention is suitable for a wire electrical discharge machine that performs machining operation while applying a voltage from an anticorrosive power source by use of a water-based dielectric fluid.

The invention claimed is:

1. An electric discharge machine that machines a workpiece by using a water-based dielectric fluid as a dielectric fluid while a voltage is being applied to a machining gap between an electrode and the workpiece, the electric discharge machine comprising:
   an anticorrosive power source section that applies a predetermined voltage by taking the workpiece as a cathode and taking as an anode an anticorrosive electrode opposing the workpiece with an electrical insulator between the workpiece and the anticorrosive electrode;
   a dielectric fluid quality measuring instrument that measures a quality of the dielectric fluid; and
   a dielectric fluid quality control section that controls a pH level of the dielectric fluid to be within a range from 8.5 to 10.5 on the basis of the measured quality of the dielectric fluid,
   wherein the dielectric fluid quality measuring instrument includes a conductivity meter that measures a conductivity of the dielectric fluid.

2. The electric discharge machine according to claim 1, wherein the dielectric fluid quality control section controls a flow of the dielectric fluid to a water purifying resin section and an anticorrosive resin section including an OH⁻ negative ion exchange resin, to control the pH level of the dielectric fluid.

3. The electric discharge machine according to claim 1, wherein the dielectric fluid quality control section controls a flow of the dielectric fluid to a water purifying resin section and an anticorrosive resin section into which a positive ion exchange resin and a negative ion exchange resin are mixed, to control the pH level of the dielectric fluid.

4. The electric discharge machine according to claim 3, wherein the anticorrosive resin section includes $Na^+$, $K^+$, or $Ca^{2+}$ positive ion exchange resins and an OH⁻ negative ion exchange resin.

5. The electric discharge machine according to claim 1, wherein the anticorrosive power source section is connected in such a way that a table on which the workpiece is placed is taken as a cathode and that the anticorrosive electrode opposing the table with the insulator therebetween is taken as an anode to apply the predetermined voltage.

6. The electric discharge machine according to claim 5, wherein the anticorrosive power source section is connected in such a way that a working tank is taken as an anode to cause the working tank to act as the anticorrosive electrode.

7. The electric discharge machine according to claim 5, wherein the anticorrosive power source section applies a voltage from 1 to 20 volts during machining and non-machining operation.

8. An electric discharge machining method for machining a workpiece by use of a water-based dielectric fluid as a dielectric fluid while a voltage is being applied to a machining gap between an electrode and the workpiece, the electric discharge machining method comprising:
   applying a predetermined voltage by an anticorrosive power source section in which the workpiece is taken as a cathode and an anticorrosive electrode is taken as an anode, the anticorrosive electrode being opposing a table with an insulator between the workpiece and the anticorrosive electrode;
   measuring a quality of the dielectric fluid by a dielectric fluid quality measuring instrument; and
   controlling a pH level of the dielectric fluid to be within a range from 8.5 to 10.5 on the basis of the measured quality of the dielectric fluid,
   wherein the pH level of the dielectric fluid is controlled by measuring a conductivity of the dielectric fluid on the basis of the dielectric fluid quality measuring instrument, and controlling a flow of the dielectric fluid to a water purifying resin section and an anticorrosive resin section including an OH⁻ negative ion exchange resin.

9. An electric discharge machining method for machining a workpiece by use of a water-based dielectric fluid as a dielectric fluid while a voltage is being applied to a machining gap between an electrode and the workpiece, the electric discharge machining method comprising:
   applying a predetermined voltage by an anticorrosive power source section in which the workpiece is taken as a cathode and an anticorrosive electrode is taken as an anode, the anticorrosive electrode being opposing a table with an insulator between the workpiece and the anticorrosive electrode;
   measuring a quality of the dielectric fluid by a dielectric fluid quality measuring instrument; and
   controlling a pH level of the dielectric fluid to be within a range from 8.5 to 10.5 on the basis of the measured quality of the dielectric fluid,
   wherein the pH level of the dielectric fluid is controlled by measuring a conductivity of the dielectric fluid on the basis of the dielectric fluid quality measuring instrument and controlling a flow of the dielectric fluid to a water purifying resin section and an anticorrosive resin section into which a positive ion exchange resin and a negative ion exchange resin are mixed.

10. The electric discharge machining method according to claim 9, wherein the anticorrosive power source section is connected in such a way that a table on which the workpiece is to be placed is taken as a cathode and that the anticorrosive electrode opposing the table with the insulator therebetween is taken as an anode to apply the predetermined voltage.

11. The electric discharge machining method according to claim 10, wherein the anticorrosive power source section applies a voltage from 1 to 20 volts during machining and non-machining operation.

\* \* \* \* \*